(12) United States Patent
Iino

(10) Patent No.: US 6,224,479 B1
(45) Date of Patent: May 1, 2001

(54) VENTILATION SYSTEM FOR CAR WINDOW

(76) Inventor: Koji Iino, 1-380, Takahana-cho, Omiya-shi, Saitama (JP)

( * ) Notice: Subject to any disclaimer, the term of this patent is extended or adjusted under 35 U.S.C. 154(b) by 0 days.

(21) Appl. No.: 09/488,452

(22) Filed: Jan. 20, 2000

(30) Foreign Application Priority Data

Jan. 22, 1999 (JP) .................................................. 11-014731
Oct. 7, 1999 (JP) .................................................. 11-286577

(51) Int. Cl.[7] .......................................................... B60J 1/20
(52) U.S. Cl. ............................................................... 454/132
(58) Field of Search ................................... 454/132, 131, 454/133, 135, 128

(56) References Cited

U.S. PATENT DOCUMENTS

| | | | |
|---|---|---|---|
| 4,111,106 | * | 9/1978 | Burns ....................... 454/131 |
| 4,546,693 | * | 10/1985 | McTaw, Jr. ............... 454/131 |
| 4,799,422 | * | 1/1989 | Birt ........................... 454/131 |
| 4,864,920 | * | 9/1989 | Inagaki ..................... 454/131 |
| 5,094,151 | * | 3/1992 | Bernard ..................... 454/131 |
| 5,683,293 | * | 11/1997 | Mohammed ............... 454/131 |

FOREIGN PATENT DOCUMENTS

| | | | |
|---|---|---|---|
| 3131803 | * | 2/1983 | (DE) ...................... 454/131 |
| 2215034A | * | 9/1989 | (GB) ...................... 454/131 |

* cited by examiner

*Primary Examiner*—Harold Joyce
*Assistant Examiner*—Derek S. Boles
(74) *Attorney, Agent, or Firm*—Pitney, Hardin, Kipp & Szuch LLP

(57) ABSTRACT

A ventilation system for a car window comprising a body housing 11, blocking plates A (13) and B (14'), and a plurality of airflow members (18, 19, 20, 21 and 55), wherein: the plurality of airflow members (18, 19, 20, 21, 55) are arranged in layers in an inner chamber following a ventilation opening 11a of the body housing (11); and a cover plate (56) which can be opened/closed to adjust the quantity of air flowing through all the airflow members (18, 19, 20, 21 and 55) is provided on a cover frame (52) to which the innermost airflow member (55) is attached, whereby a ventilating function is given to the car window so that the quantity of air flowing through the car window can be adjusted at option.

12 Claims, 13 Drawing Sheets

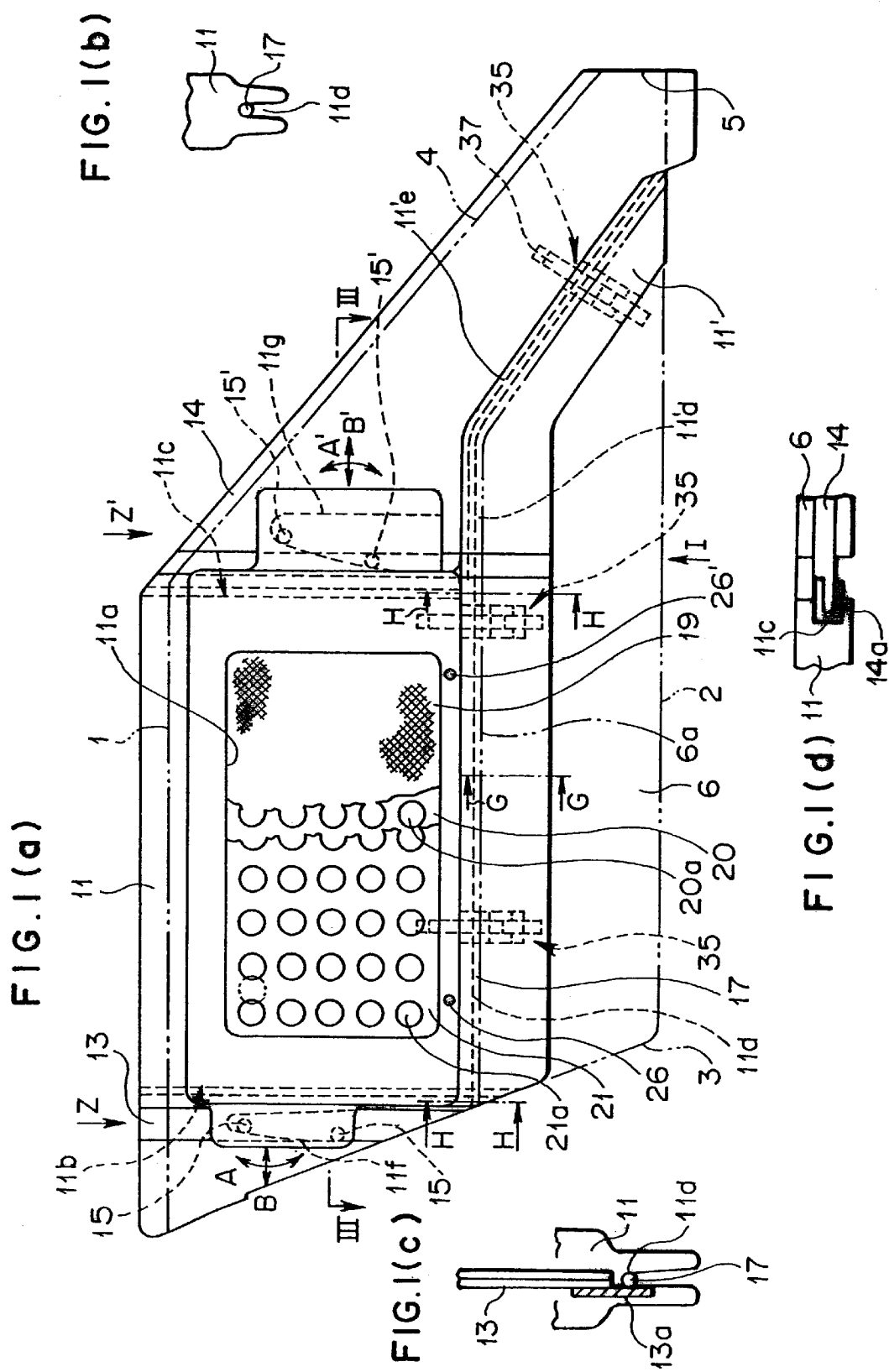

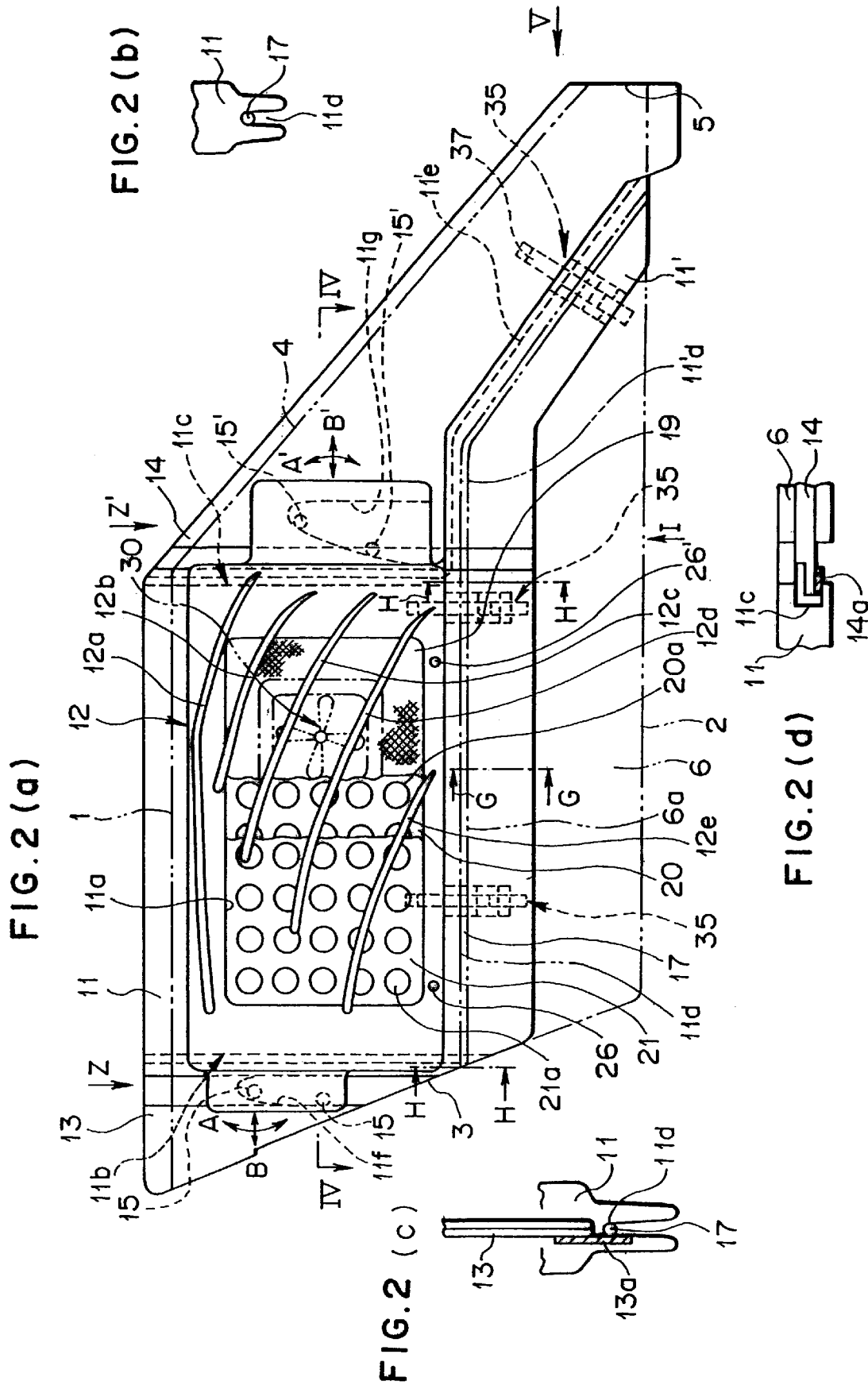

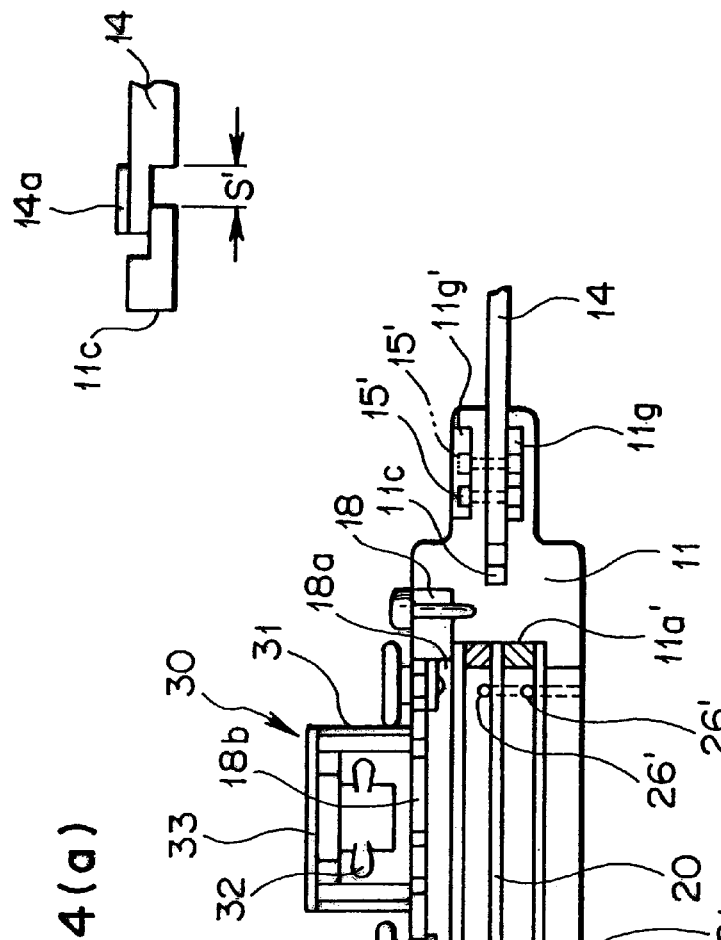
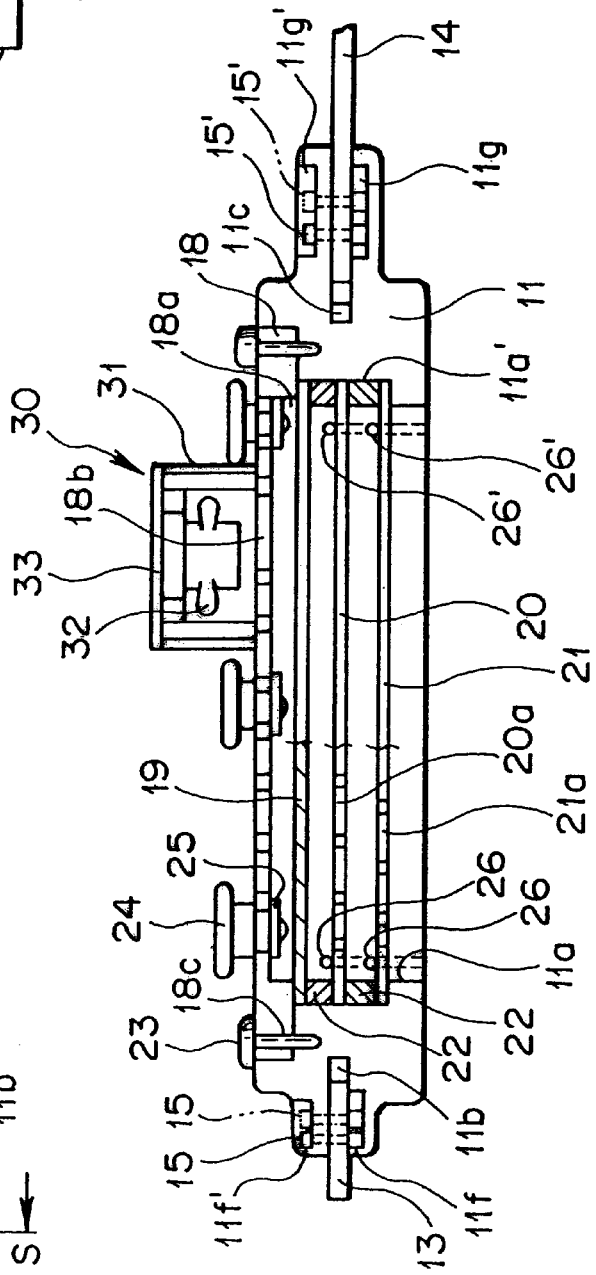
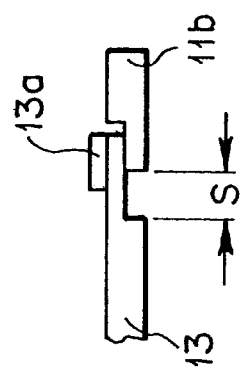

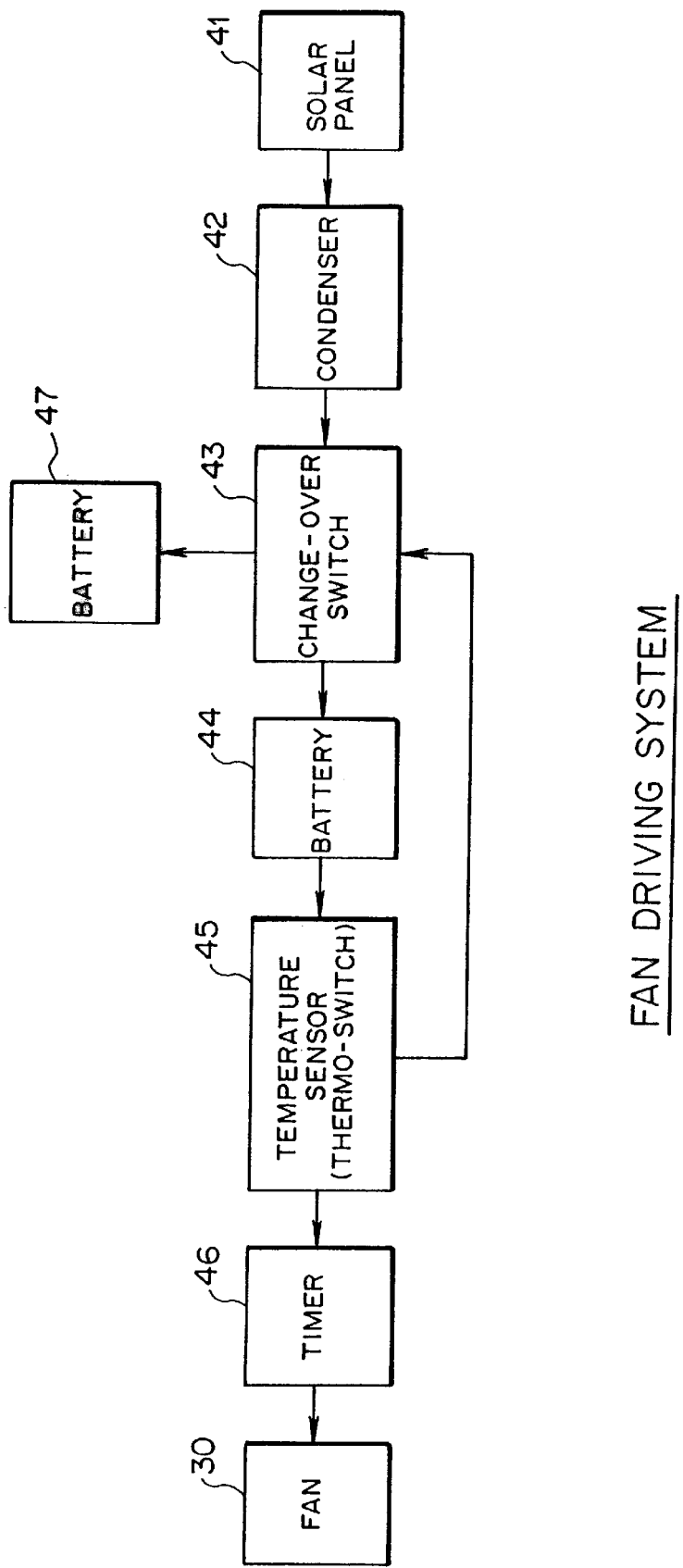

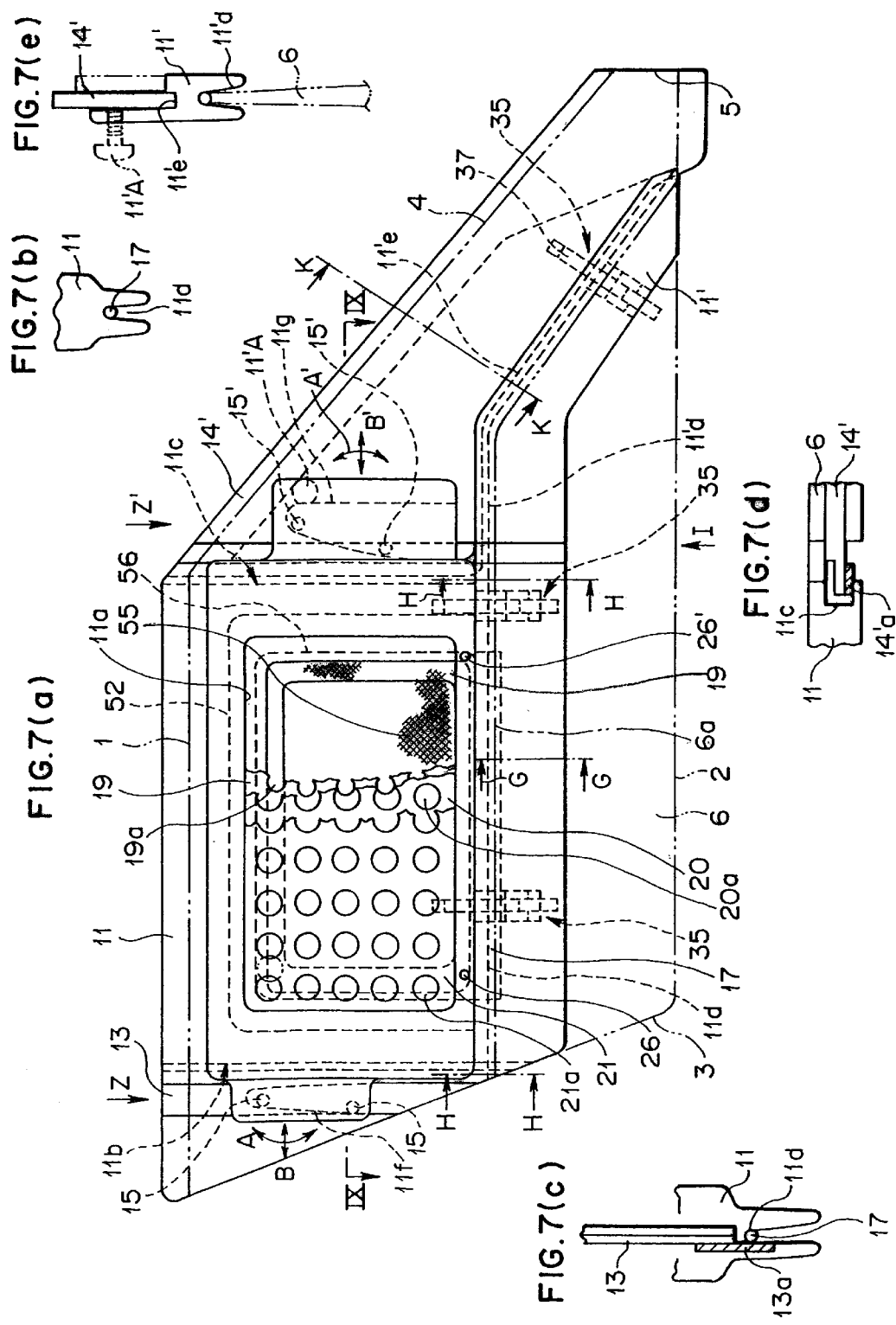

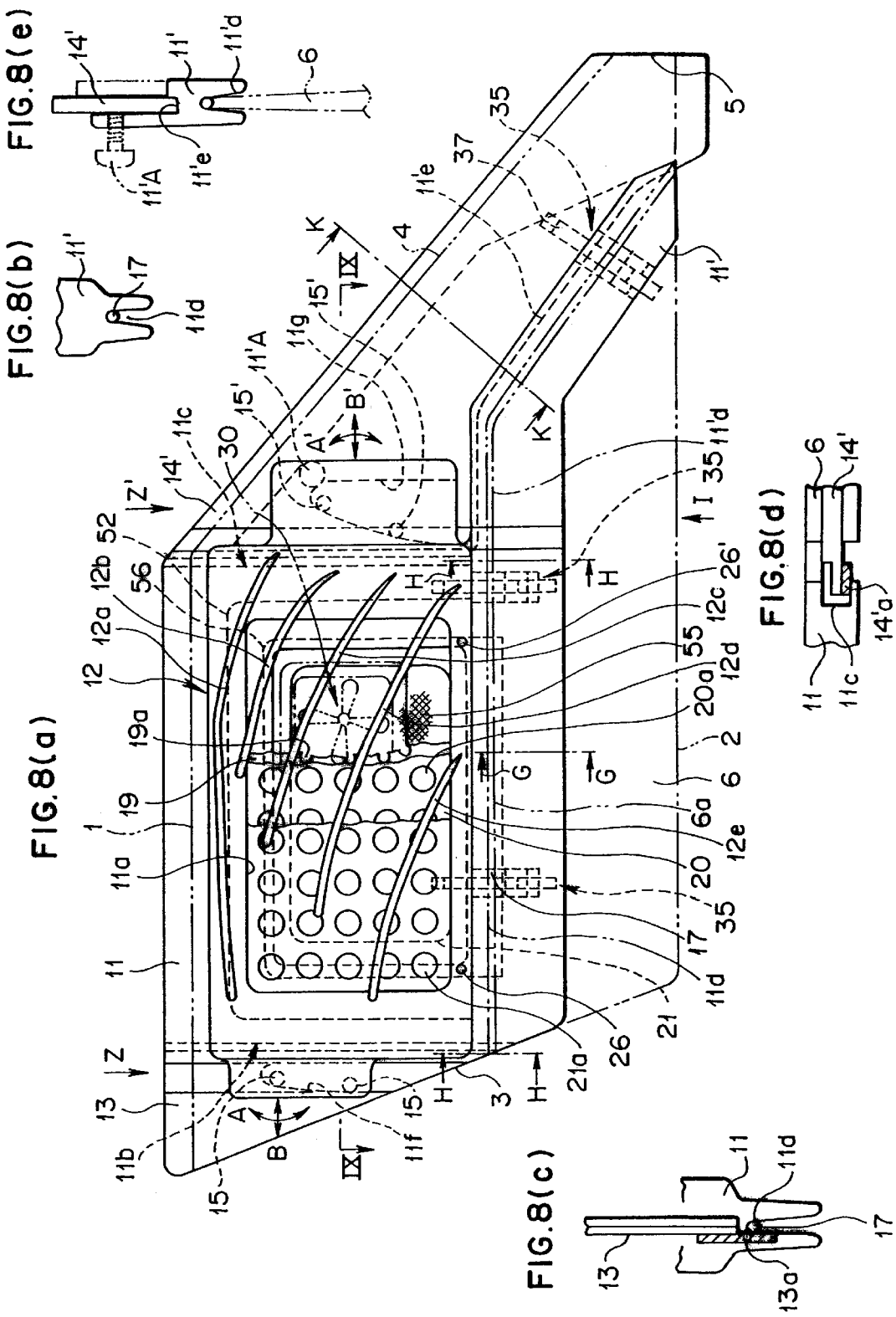

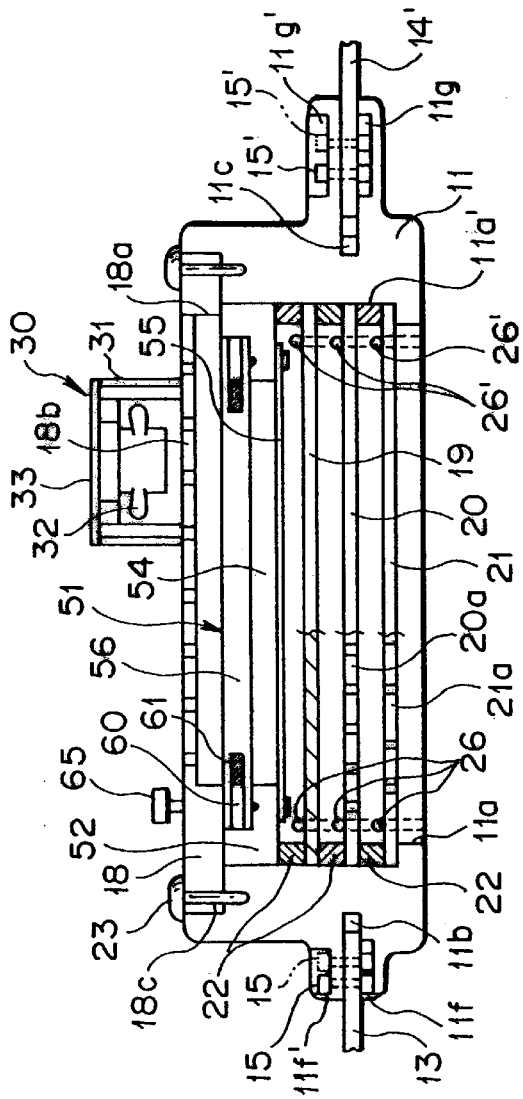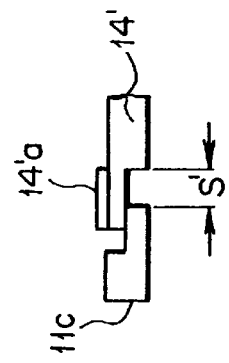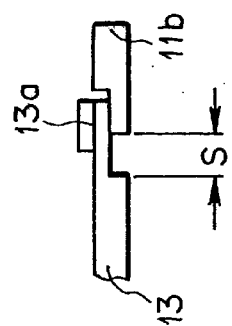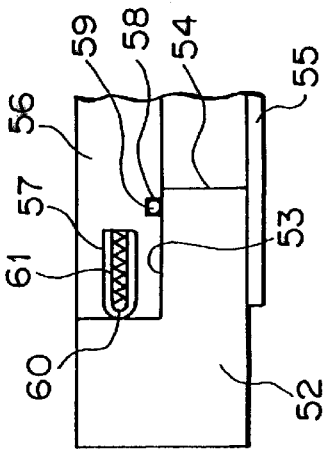

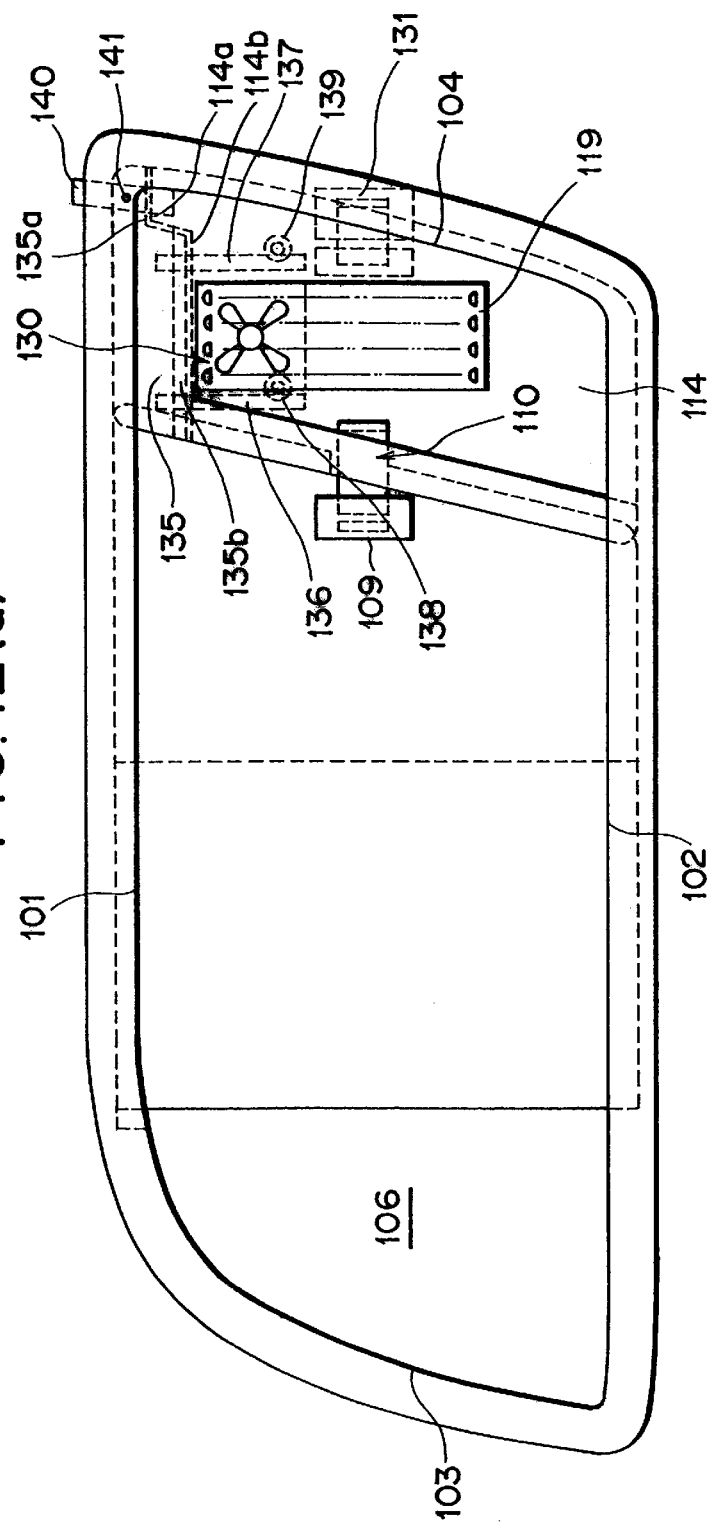
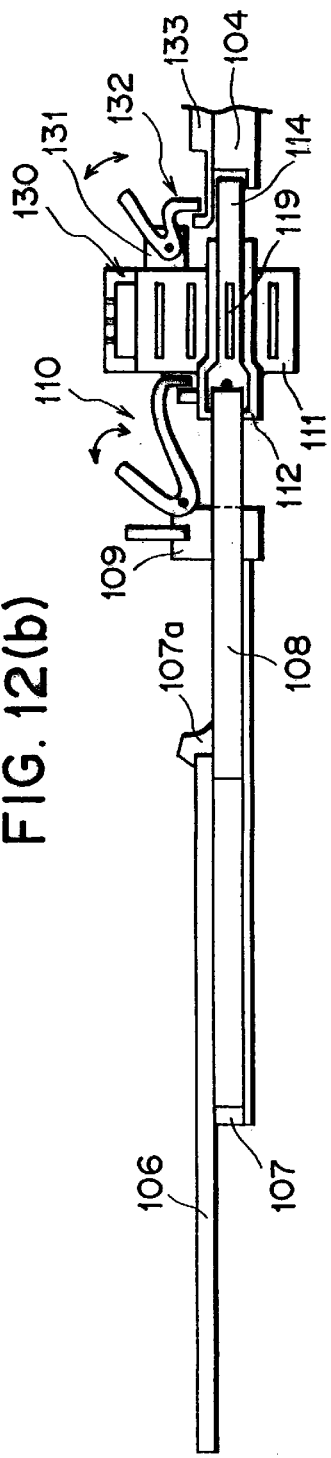
FIG. 12(a)
FIG. 12(b)

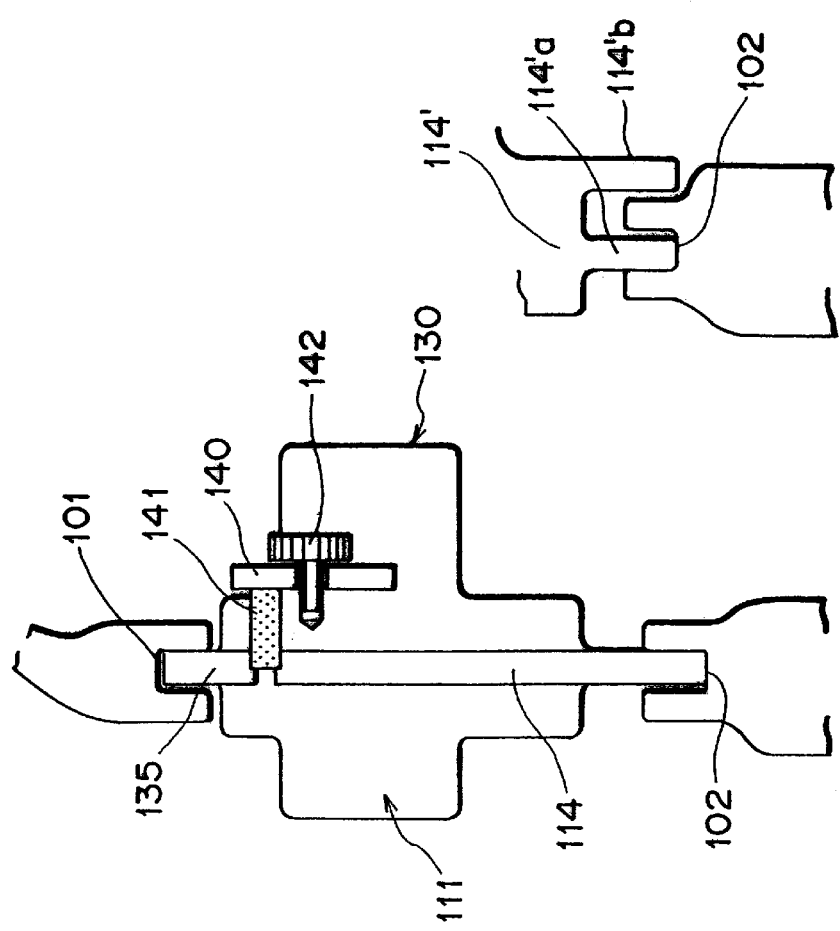

VENTILATION SYSTEM FOR CAR WINDOW

BACKGROUND OF THE INVENTION

1. Field of the Invention

The present invention relates to a ventilation system for a car window.

2. Description of the Related Art

As a known car window ventilation system of such a type, there have been a detachable car ventilation system in which a window panel integrally molded from plastics, or the like, and having a plurality of ventilating holes is put between a door sash frame and an upper end edge of window glass in a car so that natural ventilation to let fresh air in is performed (JP-A-2-220924); a car window ventilation system in which an exhaust fan is merely provided in a slight gap between a door sash frame and an upper end edge of window glass in a car (JP-U-6-55818); and so on.

These car window ventilation systems are, however, of the type in which a window panel is put between a door sash frame and an upper end edge of window glass in a car so that four sides of the window panel are not adjustable. Hence, there is a defect that the systems lack applicability to windows different in size and shape and to different types of cars. Furthermore, air exhausting only by means of a fan without use of natural ventilation to let fresh air in involves a defect that the capacity of ventilation is often insufficient.

In any of the related art, known ventilation systems, the ventilating member is constituted by a single layer filter. Hence, there is an inconvenience of invasion of dust or rainwater. Furthermore, the known ventilation systems were configured so as to be easily subjected to mischief from the outside. In addition, there was a risk that something might be thrown into the car from the outside through such airflow holes because of the shape of airflow holes in the related-art ventilating members.

SUMMARY OF THE INVENTION

An object of the present invention is to provide a ventilation system for a car window which is configured such that the system can be widely applied to car windows different in size and shape or different types of cars; which is configured such that members such as a fan unit, etc. can be used in various combinations as constituent members of the system in accordance with a ventilating function so that the system can be flexibly adapted to user's option and dust, rainwater, or the like, can be prevented from invading the car from the outside directly; and in which the quantity of air flowing through airflow members can be adjusted.

The foregoing object is achieved by the invention defined in claims.

According to the present invention, the car window ventilation system can be adapted to user s option as to whether only a natural ventilation function is used to let fresh air in or a fan unit is additionally used to perform forced ventilation, whether a housing is provided with sunshade and weatherproof eaves or not, and whether a solar battery is used or a battery built in the car is used for actuating the fan unit.

Furthermore, when blocking plates which are portions for connecting a car window frame and an upper edge of window glass to each other (that is, adjustable blocking plates substantially as thick as the window glass) are formed by simply cutting a blocking plate material of transparent acrylic resin, or the like, having a predetermined thickness into predetermined contours while one and the same body housing is always used in the ventilation system, the ventilation system can be generally applied to windows different in size and shape and to cars different in types. Hence, the ventilation system can be attached to various types of cars because the ventilation system is not formed as an exclusive product which is produced by use of an expensive mold as in the related art and which can be applied to no car type but a specific car type. It is, however, a matter of course that final contour finishing of the blocking plates is performed by a cutting machine placed in a car window ventilation system maker, a car repair shop, or the like, because general users cannot finish such blocking plates.

Furthermore, when a cover plate is provided on a cover frame to which the airflow members are attached so as to be able to be opened/closed to adjust the quantity of air flowing through all the airflow members, a ventilating function can be given to the car window so that the quantity of air flowing through the car window can be adjusted.

Although the following embodiments show the case where the car window ventilation system according to the present invention is attached to a side door of a car, it is a matter of course that the ventilation system having the same configuration as described above can be applied also to a rear window of the car.

BRIEF DESCRIPTION OF THE DRAWINGS

FIGS. 1(a) to 1(d) are views showing a ventilation system for a car window according to a first embodiment of the present invention in which FIG. 1(a) is a front view, FIG. 1(b) is a sectional view taken along the line G—G in FIG. 1(a), FIG. 1(c) is a sectional view taken along the line H—H in FIG. 1(a), and FIG. 1(d) is a view from the I-direction in FIG. 1(a);

FIGS. 2(a) to 2(d) are views showing a ventilation system for a car window according to a second embodiment of the present invention, in which FIG. 2(a) is a front view, FIG. 2(b) is a sectional view taken along the line G—G in FIG. 2(a), FIG. 2(c) is a sectional view taken along the line H—H in FIG. 2(a), and FIG. 2(d) is a view from the I-direction in FIG. 2(a);

FIGS. 3(a) to 3(c) are side views of the car window ventilation system according to the first embodiment of the present invention, in which FIG. 3(a) is a sectional view taken along the line III—III in FIG. 1(a), FIG. 3(b) is a view from the Z-direction in FIG. 1(a), and FIG. 3(c) is a view from the Z'-direction in FIG. 1(a);

FIGS. 4(a) to 4(c) are side views of the car window ventilation system according to the second embodiment of the present invention, in which FIG. 4(a) is a sectional view taken along the line IV—IV in FIG. 2(a), FIG. 4(b) is a view from the Z-direction in FIG. 2(a), and FIG. 4(c) is a view from the Z'-direction in FIG. 2(a);

FIG. 6 is a block diagram showing a fan driving system used in each of car window ventilation systems according to second and fourth embodiments of the present invention;

FIGS. 7(a) to 7(e) are views showing a ventilation system for a car window according to a third embodiment of the present invention, in which FIG. 7(a) is a front view, FIG. 7(b) is a sectional view taken along the line G—G in FIG. 7(a), FIG. 7(c) is a sectional view taken along the line H—H in FIG. 7(a), FIG. 7(d) is a view from the I-direction in FIG.

Figure 10A:
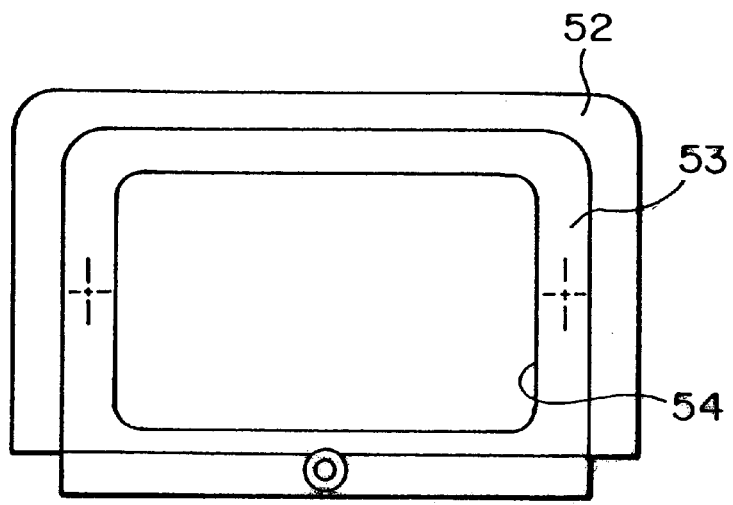
Figure 10B:
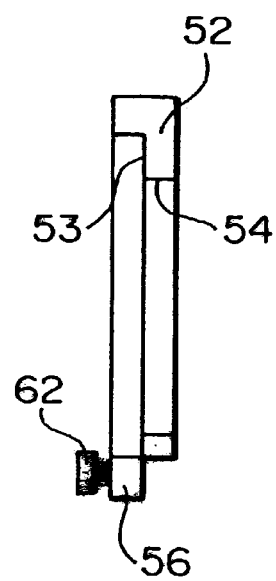
Figure 11A:
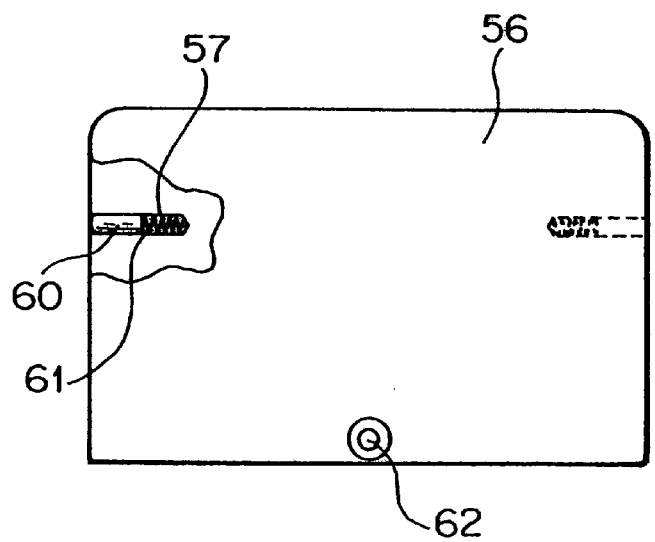
Figure 11B:
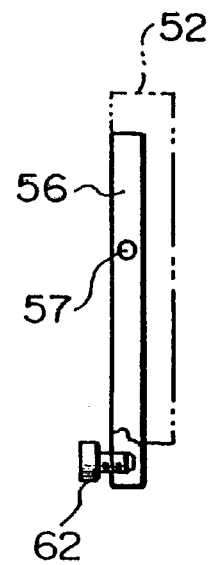

7(*a*), and FIG. 7(*e*) is a sectional view taken along the line K—K in FIG. 7(*a*);

FIGS. 8(*a*) to 8(*e*) are views showing a ventilation system for a car window according to a fourth embodiment of the present invention, in which FIG. 8(*a*) is a front view, FIG. 8(*b*) is a sectional view taken along the line G—G in FIG. 8(*a*), FIG. 8(*c*) is a sectional view taken along the line H—H in FIG. 8(*a*), FIG. 8(*d*) is a view from the I-direction in FIG. 8(*a*), and FIG. 8(*e*) is a sectional view taken along the line K—K in FIG. 8(*a*);

FIGS. 9(*a*) to 9(*d*) are side views of the car window ventilation system according to the fourth embodiment of the present invention, in which FIG. 9(*a*) is a sectional view taken along the line IX—IX in FIG. 8(*a*), FIG. 9(*b*) is a partly enlarged view of FIG. 9(*a*), FIG. 9(*c*) is a view from the Z-direction in FIG. 8(*a*), and FIG. 9(*d*) is a view from the Z'-direction in FIG. 8(*a*);

FIGS. 10(*a*) and 10(*b*) are views of a cover frame used in the car window ventilation system according to the present invention, in which FIG. 10(*a*) is a front view, and FIG. 10(*b*) is a side sectional view;

FIGS. 11(*a*) and 11(*b*) are views of a cover fitted into the cover frame of the car window ventilation system according to the present invention, in which FIG. 11(*a*) is a front view, and FIG. 11(*b*) is a side sectional view;

FIGS. 12(*a*) to 12(*f*) are views showing a first embodiment of lateral type car window ventilation system according to the present invention, in which FIG. 12(*a*) is a front view, FIG. 12(*b*) is a side view, FIG. 12(*c*) is a sectional view showing a connecting portion of a blocking plate and an upper edge and a lower edge of the car window, FIG. 12(*d*) is a sectional view showing a modified connecting portion, FIG. 12(*e*) is a side view of a rack and pinion mechanism, and FIG. 12(*f*) is a front view showing an engaging condition of the rack and pinion; and FIGS. 13(*a*) to 13(*d*) are views showing a second embodiment of lateral type car window ventilation system according to the present invention, in which FIG. 13(*a*) is a front view, FIG. 13(*b*) is a partial front view shown with a partial side view thereof, FIG. 13(*c*) is a sectional view of a fifth blocking plate 150 taken along the line A'—A' in FIG. 13(*a*) and FIG. 13(*d*) is a sectional view of a fourth blocking plate taken along the line B'—B' in FIG. 13(*a*)

DESCRIPTION OF THE PREFERRED EMBODIMENTS

Figure 3C:
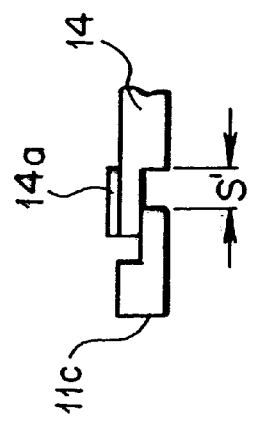
Figure 3A:
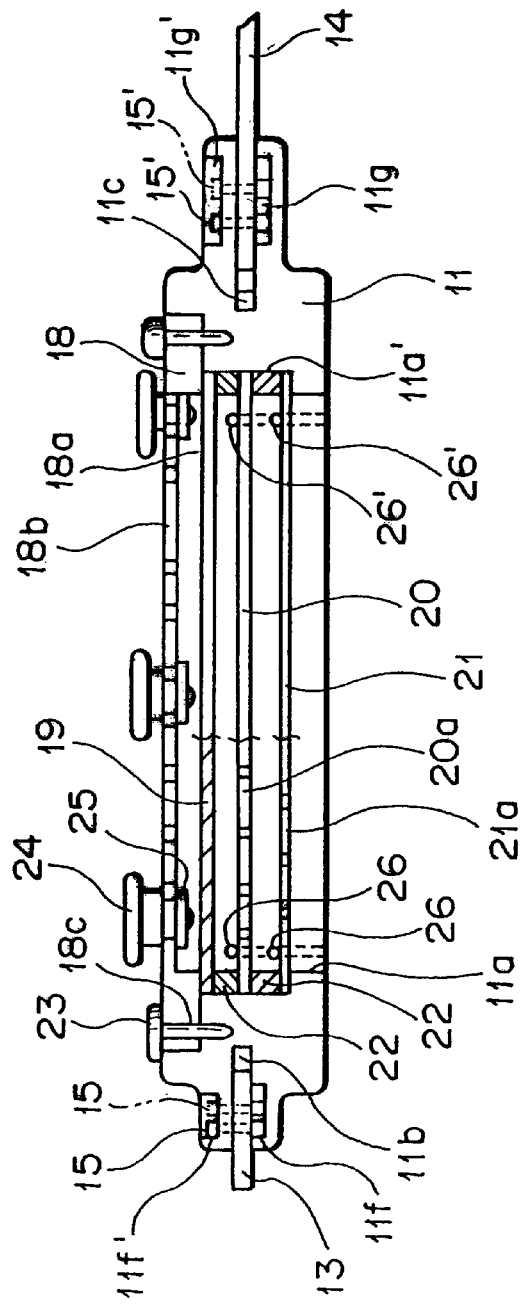
Figure 3B:
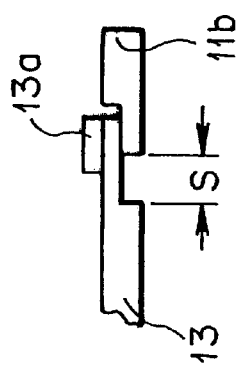
Figure 5:
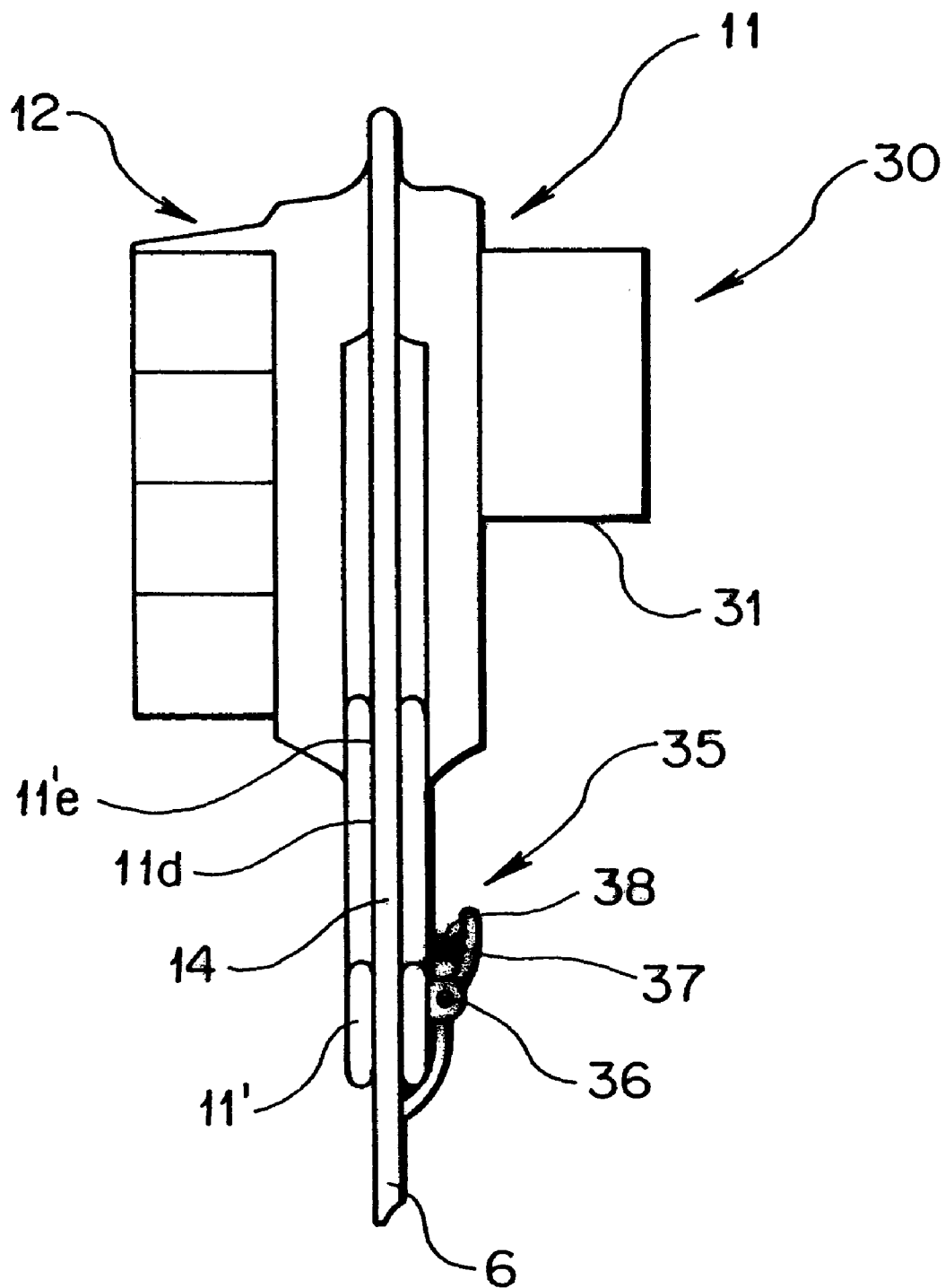
FIG. 5 is a part view of the car window ventilation system according to the present invention from the V-direction in FIG. 2(a)

FIGS. 1(*a*) to 1(*d*) and FIGS. 3(*a*) to 3(*c*) show a car window ventilation system provided with no fan unit according to a first embodiment of the present invention. FIGS. 2(*a*) to 2(*d*) and FIGS. 4(*a*) to 4(*c*) show a car window ventilation system provided with a fan unit according to a second embodiment of the present invention. FIG. 5 shows a glass retainer for locking window glass. FIG. 6 is a block diagram showing a fan locking window glass. FIG. 6 is a block diagram showing a fan driving system used in the car window ventilation system according to the second and the fourth embodiments of the present invention in the case where the fan driving system is actuated by a solar battery.

FIGS. 7(*a*) to 7(*e*) show a car window ventilation system provided with a cover plate but with no fan unit according to a third embodiment of the present invention. FIGS. 8(*a*) to 8(*e*) and FIGS. 9(*a*) to 9(*d*) show a car window ventilation system provided both with a cover plate and with a fan unit according to a fourth embodiment of the present invention. FIGS. 10(*a*) and 10(*b*) show a cover frame to which the innermost airflow member is attached. FIGS. 11(*a*) and 11(*b*) show a cover plate which is fitted into the cover frame so that the quantity of air flowing through all airflow members can be adjusted.

FIGS. 1(*a*), 2(*a*), 7(*a*) and 8(*a*) show a state in which the car window ventilation system according to the present invention is installed in a location in which window glass 6 of a car is retracted to a predetermined retreat position, that is, in a location in which an upper edge 6*a* of the window glass 6 is moved down to a position shown, for example in FIG. 1(*a*). The reference numeral 1 designates an upper edge of a window frame; 2, a lower edge of the window frame; 3, a rear edge of the window frame; 4, an inclined edge of the window frame; and 5, a front edge of the window frame.

Incidentally, the configuration of FIG. 9(*a*) showing a central section of the car window ventilation system according to the fourth embodiment of the present invention is applied also to the car window ventilation system according to the third embodiment of the present invention shown in FIG. 7(*a*) except the fan unit.

The reference numeral 11 designates a body housing. A ventilation opening 11*a* is provided in the center of the body housing 11. A groove 11*b* for the blocking plate A 13 is formed in the rear side of the body housing 11. A groove 11*c* for the blocking plate B 14 is formed in the front edge of the body housing 11. A groove 11*d* for the window glass 6 is formed in the lower edge of the body housing 11. A groove 11'*e* for the blocking plate B 14 is formed in an inclined edge of a front portion 11' of the body housing 11 which extends forward substantially in parallel with the contour of an inclined edge of the window frame. A groove 11*d* for the window glass 6 is formed in the horizontal lower edge of the body housing 11. Hence, the body housing 11 inclusive of the front portion 11' is shaped like a tadpole or a half of spectacles as a whole. On this occasion, the lower edge of the body housing 11 is disposed at a distance from the lower edge 2 of the window frame of the car so as to be located considerably above the lower edge 2. This is because it is made possible that the car window ventilation system according to the present invention is installed in any window frame only by changing the contours of the blocking plates A 13 and B 14 without necessity of deforming the body housing 11 even in the case where the window frame is different in size and shape from the window frame having the contour shown in FIG. 1(*a*).

The left end of the rear blocking plate A 13 is fitted into a window glass-retracting groove formed in the rear edge 3 of the window frame. The right end of the blocking plate A 13 is fitted into the rear groove 11*b* of the body housing 11. As is obvious from FIG. 3(*b*) or FIG. 4(*b*), a stopper having a step portion in a range of engagement with the blocking plate A 13 can be preferably fitted into the groove 11*b*. Hence, the distance between the leading end of the blocking plate A 13 having a step portion in the range of engagement with the stopper and the bottom of the groove 11*b* can be preferably adjusted. That is, the distance between the leading end of the blocking plate A 13 and the stopper can be adjusted in a range of size S. This adjustment is performed by swinging the blocking plate A 13 in directions of the arrows A and B in FIG. 1(*a*) or in FIG. (2*a*) so that the blocking plate A 13 goes into and out of the groove 11*b* of the body housing 11. The blocking plate A 13 is shaped like a right-angled triangle as a whole. The blocking plate A 13 is finally fixed to the body housing 11 by operating a tool in a facing 11*f* to connect fixing screws 15, 15 into nuts, respectively, which are not shown in detail but buried in a facing 11*f*. On this occasion, a blocking shim 13*a* as a final gap blocking member can be put between the body housing 11 and the blocking plate A 13.

On the other hand, the left end of the front blocking plate B 14 is fitted into the front groove 11*c* of the body housing 11. Other ends of the front blocking plate B 14 is fitted into the window glass groove of the inclined edge 4 of the window frame, the window glass groove of the front edge 5 of the window frame and the horizontal groove 11*d* and inclined groove 11*e* of the body housing 11. As is obvious from FIG. 3(*c*) or 4(*c*), the left end of the front blocking plate B 14 is fitted into the front groove 11*c* of the body housing 11 as follows. A stopper having a step portion in a range of engagement with the blocking plate B 14 can be preferably fitted into the groove 11*c*. Hence, the distance between the leading end of the blocking plate B 14 having a step portion in the range of engagement with the stopper and the bottom of the groove 11*c* can be preferably adjusted. That is, the distance between the leading end of the blocking plate B 14 and the stopper can be adjusted in a range of size S'. This adjustment is performed by swinging the blocking plate B 14 in directions of the arrows A' and B' in FIG. 1(*a*) or FIG. 2(*a*) so that the blocking plate B 14 goes into and out of the groove 11*c* of the body housing 11. The blocking plate B 14 is shaped like a knife handle as a whole. The blocking plate B 14 is finally fixed to the body housing 11 by operating a tool in a facing 11*g'* to connect fixing screws 15', 15' into nuts, respectively, which are not shown in detail but buried in a facing 11*g*. On this occasion, a blocking shim 14*a* as a final gap blocking member can be put between the body housing 11 and the blocking plate B 14.

The facings 11*f*, 11*f'*, 11*g* and 11*g'* are closed upward and opened downward in FIG. 1(*a*) so that the fitting states of the blocking plates A 13 and B 14 to the body housing 11 are kept when the fixing screws 15 and 15' are slightly loosened to adjust the state of fitting of the blocking plates A 13 and B 14 to the body housing 11.

The window glass 6 of the car is fitted into the lower groove 11*d* of the body housing 11 as follows. In the condition that the window glass 6 of the car is entirely pulled into a groove of the lower edge 2 of the window frame, the blocking plates A 13 and B 14 as well as the body housing 11 with a rubber seal 17 fitted into the groove lid in advance are fitted (in a temporarily assembled state) into the window glass grooves of the rear and upper edges 3 and 1 of the window frame and the inclined and front edges 4 and 5 of the window frame. Then, the fixing screws 15 and 15' are fastened to nuts which are not shown in detail but buried in the facings 11*f* and 11*g*, respectively, so that the blocking plates A 13 and B 14 are finally perfectly fixed to the body housing 11. Then, a car window glass opening/closing handle is operated to move up the car window glass 6 from the lower edge of the window frame so that the upper edge of the window glass 6 is pressed against the rubber seal 17 in the lower groove 11*d* of the body housing 11. In this condition, a window glass-locking glass retainer 35, which is attached to the front portion 11 of the body housing 11 by a pin 36 as shown in FIGS. 1(*a*) and 5 to prevent failure such as vibration, or the like, from occurring between the front portion 11' of the body housing 11 inclusive of the front blocking plate B 14 and the window glass 6, is operated so that a clamp member 37 of the glass retainer 35 locks the window glass 6 at the front portion 11' of the body housing 11 by the force of a compression spring 38. As shown in FIGS. 1(*a*) and 2(*a*), such window glass-locking glass retainers 35 can be further provided in a plurality of places in the body housing 11. For example, in FIGS. 1(*a*) and 2(*a*), such glass retainers 35 are further provided in two places in the body housing 11.

To prevent the car window ventilation system according to the present invention from being stolen or destroyed, a circuit for providing electric bridge connection between the blocking plates A 13/B 14 (or 14') and the grooves 11*b*/11*c* of the body housing 11 may be provided with an alarm connected to a midpoint of the circuit so that the alarm can issue an alarm sound when the alarm circuit is interrupted.

Referring to FIGS. 3(*a*) and 4(*a*), in the car window ventilation system according to the present invention, an inner chamber is formed so as to be surrounded by an inner wall 11*a'* which is continued to the ventilation opening 11*a* of the body housing 11 through a step portion and which has a larger opening cross-sectional area than that of the ventilation opening 11*a*. An airflow member 21 made of a perforated metal is interchangeably provided while being guided by the inner wall 11*a'*. Another airflow member 20 made of a perforated metal is interchangeably provided through a gap member 22 so as to follow the airflow member 21. A large number of airflow holes 20*a* in the airflow member 20 and a large number of airflow holes 21*a* in the airflow member 21 are arranged eccentrically in the whole surfaces of the perforated metals 21 and 20 so that the large number of airflow holes 20*a* are not aligned with the large number of airflow holes 21*a* in FIG. 1(*a*). Hence, a mesh plate 19 is used as an airflow member provided through a gap member 22 so that dust or rainwater is prevented from reaching the mesh plate 19 from the outside of the car directly. The mesh plate 19 may be replaced by a paper filter, a synthetic fiber filter, or the like, which is permeable to air. In the embodiment shown in FIGS. 3(*a*) and 4(*a*), three layers of airflow members are arranged. Further, a ventilation substrate 18 is disposed in the inner side than the mesh plate 19. The ventilation substrate 18 is fixed to the body housing 11 by screws 23 through bores 18*c*. The ventilation substrate 18 has a large number of airflow openings 18*b* because the ventilation substrate 18 also needs to have an airflow function. It is a matter of course that the ventilation substrate 18 has a ventilation opening 18*a* having the same size and shape as that of the ventilation opening 11*a* of the body housing 11. The large number of airflow openings 18*b* are used for airflow and also used for fixing the ventilation substrate 18 to the body housing 11 when several operation knobs 24 used for assembling/disassembling the ventilation substrate 18 with/from the body housing 11 or for lifting the car window ventilation system as a whole are fastened with corresponding nuts 25 respectively.

Drain holes 26 and 26' which are formed in the inner wall 11*a'* so as to be opened to the outside of the body housing 11 are provided in a lower region of the body housing 11 than the inner chamber surrounded by the inner wall 11*a'* continued to the ventilation opening 11*a* of the body housing 11 in the condition that the body housing 11 is attached to the window.

The second and the fourth embodiments shown in FIGS. 2(*a*) and 8(*a*) are different from the first and the third embodiments shown in FIGS. 1(*a*) and 7(*a*) in the points that sunshade and weatherproof eaves 12 constituted by eaves elements 12*a*, 12*b*, 12*c*, 12*d* and 12*e* are provided in the body housing 11 and that a fan unit 30 is provided as a forced ventilation unit. It is, however, a matter of course that various combinations of constituent members of the ventilation system can be made as embodiments other than the second and the fourth embodiments because the present invention is characterized in that various combinations of constituent members of the ventilation system can be made at user's option, as described in the beginning of this specification. The sunshade and weatherproof eaves 12 are partially shown also in FIG. 5. The fan unit 30 is further shown in FIGS. 2(*a*), 4(*a*), 8(*a*) and 9(*a*). The fan unit 30 is attached to the inside of the ventilation substrate 18. A fan-mounting plate 33 serving also as an airflow plate is fixed at an inner end of a fan housing 31 attached to the ventilation substrate 18. A vane wheel 32 is mounted on a main shaft in the airflow and fan-mounting plate 33 so as to be rotatable. The fan unit 30 is mounted at user's option.

FIG. 6 is a block diagram showing a system for actuating the fan unit 30 in the second embodiment of the present invention. A current obtained by photoelectric conversion in a solar panel 41 which can be attached to the inside of front glass of the car is supplied to a condenser 42. A current from the condenser 42 flows into a change-over switch 43 while prevented from flowing back. A current from the change-over switch 43 flows in a rechargeable battery 44, so that larger electric power than necessary is stored in the battery 44. A current from the battery 44 flows in the fan unit 30 through a temperature sensor (for example, thermostat) 45 and a timer 46 which can be set to determine the running time of the fan. When the inside room of the car is cooled to a temperature of not higher than the temperature set in the temperature sensor 45 in advance, a signal from the temperature sensor 45 is returned to the change-over switch 43 so that the change-over switch 43 is operated by a cigarette lighter plug socket, or the like, in the car through a lead wire connected from the change-over switch 43 to the latter. In this case, electric power generated by the solar panel can be used for purposes other than the purpose of operating the car window ventilation system, that is, the electric power can be used for charging a battery 47 originally built in the car to supplement the car battery with the electric power.

Other than the method shown in the block diagram of FIG. 6, there is, for example, a case where a cigarette lighter power supply is used in the condition that an attachment plug is attached into a cigarette lighter plug socket not shown but provided in the car. In such a case, electric power from the cigarette lighter power supply can be supplied to the fan unit. Further, there is a case where the car window ventilation system according to the present invention is provided in a solar car. In such a case, electric power from a solar generator of the solar car can be supplied to the fan unit.

FIGS. 7(a) to 7(e) show the third embodiment of the present invention. FIGS. 8(a) to 8(e) and FIGS. 9(a) to 9(d) show the fourth embodiment of the present invention. FIGS. 10(a) and 10(b) and FIGS. 11(a) and 11(b) are common to the third and fourth embodiments. The reference numeral 11 designates a body housing. A ventilation opening 11a is provided in the center of the body housing 11. A groove 11b for the blocking plate A 13 is formed in the rear side of the body housing 11. A groove 11c for the blocking plate B 14' is formed in the front edge of the body housing 11. A groove 11d for the window glass 6 is formed in the lower edge of the body housing 11. A groove 11'e for the blocking plate B 14' is formed in an inclined upper edge of a front portion 11' of the body housing 11 which extends forward substantially in parallel with the contour of an inclined edge of the window frame. A groove 11'd for the window glass 6 is formed in the horizontal lower edge of the body housing 11. Hence, the body housing 11 inclusive of the front portion 11' is shaped like a tadpole or a half of spectacles as a whole. On this occasion, the lower edge of the body housing 11 is disposed at a distance from the lower edge 2 of the window frame of the car so as to be located considerably above the lower edge 2. This is because it is made possible that the car window ventilation system according to the present invention is installed in any window frame only by changing the contours of the blocking plates A 13 and B 14' without necessity of deforming the body housing 11 even in the case where the window frame is different in size and shape from the window frame having the contour shown in FIGS. 7(a) and 8(a).

The window glass 6 of the car is fitted into the lower groove lid of the body housing 11 as follows. In the condition that the window glass 6 of the car is entirely pulled into a groove of the lower edge 2 of the window frame, the blocking plates A 13 and B 14' as well as the body housing 11 with a rubber seal 17 fitted into the groove 11d in advance are fitted (in a temporarily assembled state) into the window glass grooves of the rear and upper edges 3 and 1 of the window frame and the inclined and front edges 4 and 5 of the window frame. Then, the fixing screws 15 and 15' are fastened to nuts which are not shown in detail but buried in the facings 11f and 11g, respectively, so that the blocking plates A 13 and B 14' are finally perfectly fixed to the body housing 11. Then, a car window glass opening/closing handle is operated to move up the car window glass 6 from the lower edge of the window frame so that the upper edge of the window glass 6 is pressed against the rubber seal 17 in the lower groove lid of the body housing 11. In this condition, a window glass-locking glass retainer 35, which is attached to the front portion 11' of the body housing 11 by a pin 36 as shown in FIGS. 7(a), 8(a) and 5 to prevent failure such as vibration, or the like, from occurring between the front portion 11' of the body housing 11 inclusive of the front blocking plate B 14' and the window glass 6, is operated so that a clamp member 37 of the glass retainer 35 locks the window glass 6 at the front portion 11' of the body housing 11 by the force of a compression spring 38. As shown in FIGS. 7(a) and 8(a), such window glass-locking glass retainers 35 can be further provided in a plurality of places in the body housing 11. For example, in FIGS. 7(a) and 8(a), such glass retainers 35 are provided in two places in the body housing 11. In FIGS. 7(a) and 8(a), such a glass retainer 35 is provided in one place in the front portion 11' of the body housing 11. In FIGS. 7(e) and 8(e), the front blocking plate B 14' is fitted into the inclined groove 11'e of the front portion 11' of the body housing 11 in the condition that the front portion 11' rides on the window glass 6 by the groove 11'd. The front portion 11' is fixed to the front blocking plate B 14' by screws 11'A provided in three places.

Referring to FIG. 9(a), in the car window ventilation system according to the present invention, an inner chamber is formed so as to be surrounded by an inner wall 11a' which is continued to the ventilation opening 11a of the body housing 11 through a step portion and which has a larger opening cross-sectional area than that of the ventilation opening 11a. An airflow member 21 made of a perforated metal is interchangeably provided while being guided by the inner wall 11a'. Another airflow member 20 made of a perforated metal is interchangeably provided through a gap member 22 so as to follow the airflow member 21. A large number of airflow holes 20a in the airflow member 20 and a large number of airflow holes 21a in the airflow member 21 are arranged eccentrically in the whole surfaces of the perforated metals 21 and 20 so that the large number of airflow holes 20a are not aligned with the large number of airflow holes 21a in FIG. 7(a). Hence, a mesh plate 19 is used as an airflow member provided through a gap member 22 so that dust or rainwater is prevented from reaching the mesh plate 19 from the outside of the car directly. The mesh plate 19 may be replaced by a paper filter, a synthetic fiber filter, a filter having airflow perorations 19a, or the like, which is permeable to air. Further, as shown in FIGS. 9(a), 9(b) and 10(a) through 11(b), a cover frame 52 of a cover unit 51 is attached to the body housing 11 so as to be guided by the inner wall 11a' through the gap member 22. For example, an airflow member 55 made from wire netting or the like and located so as to follow the airflow members 21, 20 and 19 is attached to the cover frame 52. An opening 54 is formed in the center of the cover frame 52. A cover plate 56 is provided on the cover frame 52 so as to block the opening 54. The cover plate 56 can be slid on a step portion 53 of the cover frame 52 so as to be opened/closed by the manipulation of a knob 62. To frictionally fit the cover plate 56 to the cover frame 52 in any open position, pins 60 urged to be pressed by springs 61 are provided in holes 57, 57 on the left and right sides of the cover plate 56 respectively. Hence, the pins 60 are frictionally fitted to the side walls of the step portions 53 of the cover frame 52. The cover plate 56 is made slidable on the step portions 53 of the cover frame 52, while sealed by a seal ring 58 fitted in a seal groove 59 formed in the cover plate 56, and made to be fixed in any position. The knob 62 in the lower portion of the cover plate 56 is manipulated so that the cover plate 56 is locked with the cover frame 52 by tightening of a lock bolt 65 attached to the ventilation substrate 18 and having an end reaching the cover plate 56. As a result, the quantity of air flowing through the opening 54 of the cover frame 52, that is, all the airflow members 21, 20, 19 and 55 can be adjusted to any value inclusive of zero.

In the embodiment shown in FIG. 9(a), four layers of airflow members are arranged. Further, a ventilation substrate 18 is disposed in the inner side than the mesh plate 19. The ventilation substrate 18 is fixed to the body housing 11 by screws 23 through bores 18c. The ventilation substrate 18 has a large number of airflow openings 18b because the ventilation substrate 18 also needs to have an airflow function. It is a matter of course that the ventilation substrate 18 has a ventilation opening 18a having the same size and shape as that of the ventilation opening 11a of the body housing 11. The large number of airflow openings 18b are used for airflow and also used for fixing the ventilation substrate 18 to the body housing 11 when several operation knobs (not shown) used for assembling/disassembling the ventilation substrate 18 with/from the body housing 11 or for lifting the car window ventilation system as a whole are fastened with corresponding nuts (not shown) respectively.

Drain holes 26 and 26' which are formed in the inner wall 11a' so as to be opened to the outside of the body housing 11 are provided in a lower region of the body housing 11 than the inner chamber surrounded by the inner wall 11a' continued to the ventilation opening 11a of the body housing 11 in the condition that the body housing 11 is attached to the window.

The fourth embodiment shown in FIG. 8(a) is different from the third embodiment shown in FIG. 7(a) in the point that sunshade and weatherproof eaves 12 constituted by eaves elements 12a, 12b, 12c, 12d and 12e are provided in the body housing 11 and that a fan unit 30 is provided as a forced ventilation unit. It is, however, a matter of course that various combinations of constituent members of the ventilation system can be made as embodiments other than the third and fourth embodiments because the present invention is characterized in that various combinations of constituent members of the ventilation system can be made at user's option, as described in the foregoing of the specification.

FIGS. 12(a) to (e) and FIGS. 13(a) to (d) respectively show the first and the second embodiments of lateral type car window ventilation system according to the present invention.

In the first embodiment shown in FIGS. 12(a) to 12(e), a window frame 107 and a seal 107a are provided to a front end of a car window glass 106 and a third blocking plate 108 is retractably contained, while sliding, in said window frame 107.

A fitting 109 having a lock 110 is fixed to a front end range of the third blocking plate 108 which is combined to the first blocking plate 114 by engaging a hook of the lock 110 and a jaws of a fitting 112 which holds the first blocking plate 114 and fitted between the front edge 104 of the window frame and the third blocking plate 108.

A body housing 111 which can be installed plurality of mesh plates 119 in layers at its central portion is provided to the first blocking plate 114. Mesh bores of the mesh plate 119 can be usual perforated bores or formed by pressing the plate thereby forming an airflow half round slit screen stamped from inside to outside or an airflow slit screen stamped from inside to outside, thereby an outer surface of the mesh plate 119 being protruded toward outside. Thus formed, the structure of the mesh plate 119 is air permeable but can prevent direct invasion of wind and rain.

A fan unit 130 which can ventilate air inside of the car to outside is provided to an inner side of the body housing 111.

As shown in FIG. 12(b), the first blocking plate 114 can be engaged to a hook of a tie member 133 which is fixed to the front edge 104 of the window frame by a lock 132 fixed to a fitting 131 which is provided to a front end of the first blocking plate 114.

Referring to FIGS. 12(a) and 12(c), the second blocking plate 135 serves to seal the space between an upper edge 101 of the car window and a lower edge 114b of the first blocking plate 114. The second blocking plate 135 is moved up and down by two pairs of racks and pinions 136, 137, 138 and 139 which are provided to the first blocking plate 114, while a lower surface 135b thereof being supported, to insert an upper edge of the second blocking plate 135 into a groove for the upper edge 101 of the car window. 138a and 139a are knobs of pinions 138 and 139, respectively.

The second blocking plate 135 has a step portion 135a and the lower surface 135b. The step portion 135a is supported by a front upper end 114a of the first blocking plate 114 and the lower surface 135b is supported by a lower edge 114b of the first blocking plate 114 when it descends. A seal 141 is placed between the front upper end 114a of the first blocking plate 114 and the step portion 135a of the second blocking plate 135, and the space between them is sealed by fastening a screw 142 through a pressing plate 140 fixed to the first blocking plate 114.

FIG. 12(d) shows an modified embodiment of the connecting portion of the first blocking plate 114 and a lower edge 102 of the window. In this embodiment, the lower edge of the modified first blocking plate 114' has two convex edges 114'a and 114'b which are engaged with groove for the lower edge 102 of the window glass thereby sealing the lower edge of the modified first blocking plate 114 to the car window.

Figure 13A:
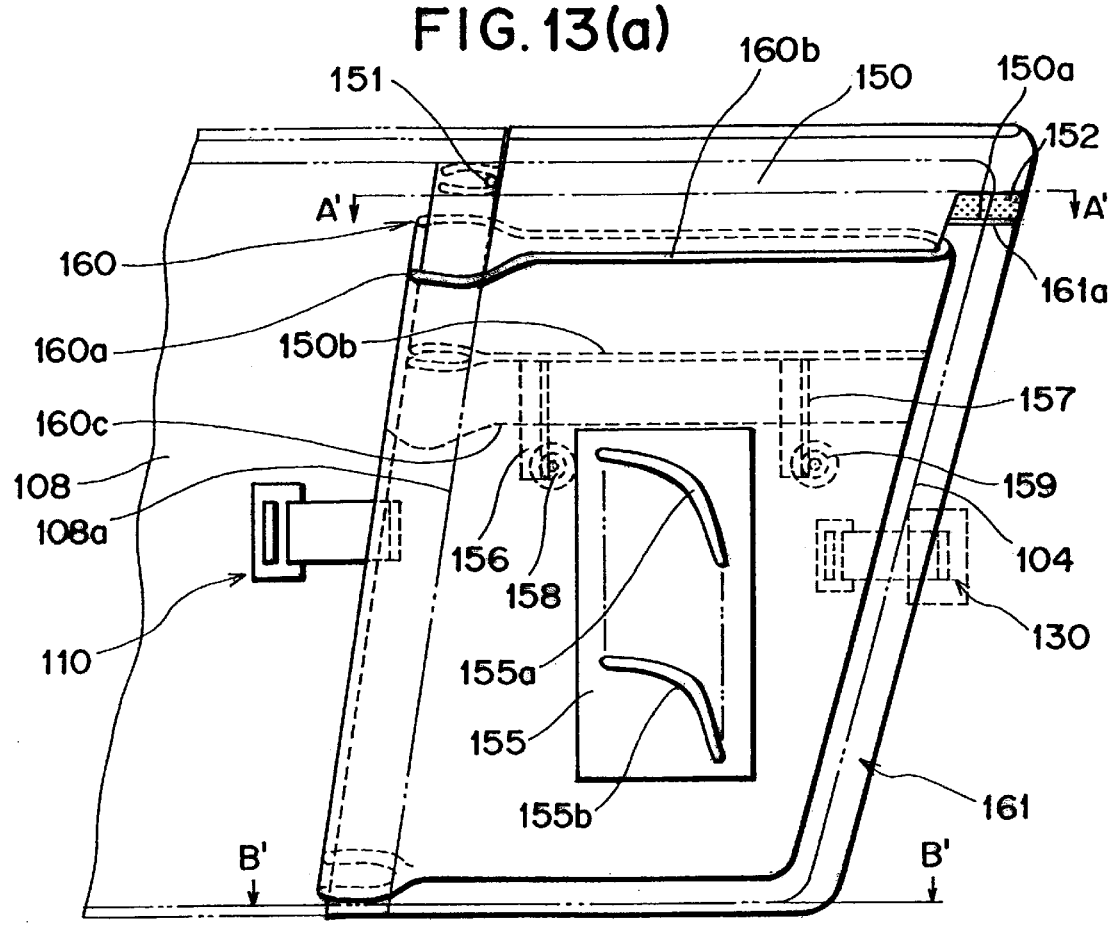

FIGS. 13(a) and (b) show the second embodiment of the lateral type car window ventilation system according to the present invention.

The lock 110 is provided to the third blocking plate 108 which is retractably contained in the car window frame and can be engaged to a hook not shown in the Fig. but fixed to a blocking plate container 160.

The rear edge of the blocking plate container 160 is formed to have a receiving portion 160a which surrounds the front end of the third blocking plate 108, and the remaining portion is formed over its whole width thereof to have a concave portion 160b for containing a fifth blocking plate 150 and a bottom 160c.

The front edge of the blocking plate container 160 forms a fourth blocking plate 161 which is fitted into the groove for the front edge 104 of the window frame. The fourth blocking plate 161 can be formed integrally with the blocking plate container 160 or can be formed separately and combined detachably to the blocking plate container 160 by bolts and nuts.

The thickness of the blocking plate container 160 can be thinner toward downward direction and the thickness of its lowest edge can be same as that of the fourth blocking plate 161.

Figure 13B:
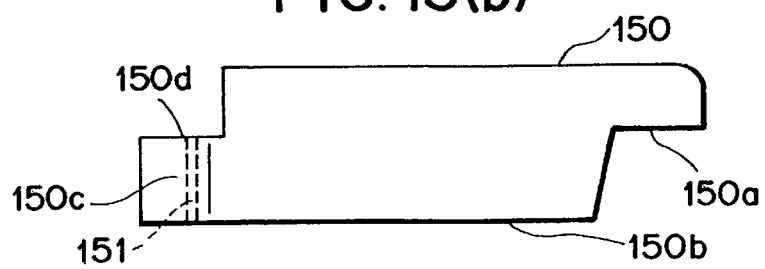
Figure 13C:
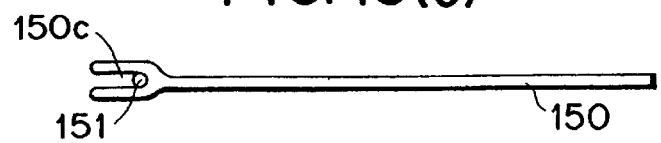
Figure 13D:
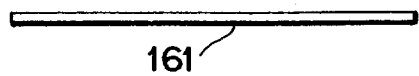

The upper edge of a fifth blocking plate 150 can be fitted into the groove for the upper edge 101 of the car window. As shown in FIG. 13(b), the fifth blocking plate 150 has a front step portion 150a, a lower surface 150b, a rear step portion 150d and a groove 150c which connects to a front edge 108a of the third blocking plate 108. As shown in FIG. 13(c), a seal 151 is fitted into the groove 150c to seal a space between the front edge 108a of the third blocking plate 108 and the groove 150c of the fifth blocking plate 150.

The front step portion 150a of the fifth blocking plate 150 is supported on a step portion 161a of the blocking plate container 160 through a seal 152. The lower surface 150b of the fifth blocking plate 150 is supported on the bottom 160c of the concave portion 160b for holding the fifth blocking plate 150 when the fifth blocking plate 150 goes down to the lowest position. In other case, the lower surface 150b of the fifth blocking plate 150 is supported by an upper end of racks 156a and 157 by operating a knob which is not shown in the Fig., but attached to the racks and pinion 156, 158, 157 and 159 thereby moving the fifth blocking plate 150 up and down.

As shown in FIG. 13(a), An airflow sunshade and weatherproof eaves 155 is constituted by plural of eaves elements 155a, 155b and etc.

What is claimed is:

1. A ventilation system for a window of a car comprising a body housing (11), blocking plates A (13) and B (14), and a plurality of airflow members (18, 19, 20, 21), wherein:
   said body housing (11) includes grooves formed in circumferential edges thereof, and a ventilation opening (11a) formed in a center portion thereof, said grooves having, at least, a rear groove (11b) formed in a rear side of a car window region, a front groove (11c) formed in a front side of the car window region, and a lower groove (11d) formed in a lower side of the car window region, a right end of said blocking plate A (13) and a left end of said blocking plate B (14) being fitted into said rear groove (11b) and said front groove (11c) respectively so as to be both detachable and adjustable, window glass (6) being partially retracted relative to a lower edge (2) of a car window frame so as to be detachably fitted into said lower groove (11d), remaining circumferential edges of said blocking plates A (13) and B(14) being fitted into a rear edge (3), an upper edge (1), an inclined edge (4), and a front edge (5), respectively, of said car window frame; and
   said plurality of airflow members comprise (a) a plurality of airflow members (20, 21) having a large number of airflow holes (20a, 21a) and (b) a mesh plate (19) which are arranged in layers in an inner chamber following said ventilation opening (11a) of said body housing (11) through gap members (22), and said large number of airflow holes (20a) of one airflow member (20) and the large number of airflow holes (21a) of another airflow member (21) are arranged eccentrically in the whole surface of each said airflow members (20, 21) so that the large number of airflow holes (20a) of one airflow member (20) are not aligned with the airflow holes (21a) of another airflow member (21), and (c) a ventilation substrate (18) having an airflow function.

2. A car window ventilation system comprising a body housing (11), blocking plates A (13) and B (14'), and a plurality of airflow members (18, 19, 20, 21, 55) wherein:
   said body housing (11) includes grooves formed in circumferential edges thereof, and a ventilation opening (11a) formed in a center portion thereof, said grooves having, at least, a rear groove (11b) formed in a rear side of a car window region, a front groove (11c) formed in a front side of the car window region, and a lower groove (11d) formed in a lower side of the car window region, a right end of said blocking plate A (13) and a left end of said blocking plate B (14') being fitted into said rear groove (1 lb) and said front groove (11c) respectively so as to be both detachable and adjustable, window glass (6) being partially retracted relative to a lower edge (2) of a car window frame so as to be detachably fitted into said lower groove (11d), remaining circumferential edges of said blocking plates A (13) and B (14') being fitted into a rear edge (3), an upper edge (1), an inclined edge (4) and a front edge (5), respectively, of said car window frame;
   said plurality of airflow members comprise (a) plurality of airflow members (20, 21) having a large number of airflow holes (20a, 21a), (b) plurality of mesh plates (19, 55) which are arranged in layers in an inner chamber following said ventilation opening (11a) of said body housing (11) through gap members (22), and said large number of airflow holes (20a) of one airflow member (20) and the large number of airflow holes (21a) of another airflow member (21) are so arranged eccentrically in the whole surface of each said airflow members (20, 21) so that the large number of airflow holes (20a) of one airflow member (20) are not aligned with the airflow holes (21a) of another airflow member (21), and (c) a ventilation substrate (18) having an airflow function; and
   a cover plate (56) which can be opened and closed to adjust a quantity of air flowing through all the airflow members (18, 19, 20, 21, 55) is fitted into a cover frame (52) to which an innermost airflow member (55) is attached.

3. A car window ventilation system according to claim 1, further comprising a fan unit (30) additionally provided for reinforcing said ventilating function.

4. A car window ventilation system according to claim 3, wherein a solar panel (41) is attached to the car so that said solar panel (41) serves as a power supply for actuating said fan unit (30).

5. A car window ventilation system according to claim 3, wherein a lead wire is connected from said solar panel (41) to a battery (47) properly provided in the car so that electric power from said solar panel (41) attached to the car is supplied to said battery (47).

6. A car window ventilation system according to claim 4, wherein a temperature sensor (45) for setting temperature conditions for running/suspension of said car window ventilation system is provided in an electrically conducting system which performs electric conduction from said solar panel (41) attached to the car to said fan unit (30).

7. A car window ventilation system according to claim 1, wherein drain holes (26, 26') are provided so as to be opened from an inner chamber continued to said ventilation opening (11*a*) of said body housing (11) to an outer surface of said body housing (11).

8. A car window ventilation system according to claim 1, wherein said body housing (11) includes sunshade and weatherproof eaves (12) in a region of said ventilation opening (11*a*).

9. A car window ventilation system according to claim 1, wherein said ventilation system is applied to a window provided in a rear portion of the car.

10. A car window ventilation system according to claim 3, wherein, as a power supply for actuating said fan unit (30), a cigarette lighter power supply of the car is used and a power supply for a solar generator of a solar car is used when said ventilation system is installed in said solar car.

11. A car window ventilation system according to claim 1, wherein an alarm is incorporated in a circuit for performing electric bridge connection between said blocking plate A (13) and B (14 or 14') and said grooves (11*b*, 11*c*) of said body housing (11), whereby warning is issued for the purpose of preventing said ventilation system from being stolen or destroyed when said circuit is interrupted.

12. A ventilation system for a window of a car wherein a first blocking plate (114) or a fourth blocking plate (161) is provided between a third blocking plate (108) and a front edge (104) of a window frame, a second blocking plate (135) or a fith blocking plate (150) is provided between the first blocking plate (114) or the fourth blocking plate (161) and an upper edge (101) of the car window, and said second blocking plate (135) or said fifth blocking plate (150) is detachably fitted in a groove for the upper edge (101) of the car window by a rack and pinion mechanism (136, 137, 138, 139 or 156, 157, 158, 159).

* * * * *